United States Patent Office.

WILLIAM ANHEUSER, OF ST. LOUIS, MISSOURI.

Letters Patent No. 75,509, dated March 17, 1868.

---

IMPROVEMENT IN EXTRACTING SACCHARINE MATTERS FROM MALT.

---

The Schedule referred to in these Letters Patent and making part of the same.

---

TO ALL WHOM IT MAY CONCERN:

Be it known that I, WILLIAM ANHEUSER, of city and county of St. Louis, and State of Missouri, have invented a new and improved Mode of Extracting the Saccharine Juice from Malt; and I do hereby declare that the following is a full and exact description thereof.

It is at present customary with the brewers to extract the saccharine liquid in the malt by a hot or cold infusion. This extraction, however, is imperfect, leaving a great part of the juice suspended in the spongy mass of the malt remnant. Therefore, I subject the moistened malt or the refuse of it, after the customary infusion, to a process of pressing, either hot or cold, in a common power-press, or its equivalent, and thereby I obtain a perfect extraction from the malt, or an additional quantity of extract from the refuse, by which operation a great saving of saccharine juice is effected, leaving the pressed refuse in a state entirely or nearly as useful as before the pressing for feeding or other purposes.

What I claim as my invention, and desire to secure by Letters Patent, is—

1. The process of extracting the saccharine malt liquid from the malt by pressing.

2. The process of pressing the malt-refuse left after infusion, for the purpose of obtaining an additional quantity of saccharine juice.

WM. ANHEUSER.

Witnesses:
C. O. HARTMAN,
ALEX. MILLER.